United States Patent [19]

Lambert

[11] Patent Number: 4,490,924
[45] Date of Patent: Jan. 1, 1985

[54] METHOD AND APPARATUS FOR DRYING MATERIALS WHILE BEING CONVEYED

[75] Inventor: Robert D. Lambert, Tyngsborough, Mass.

[73] Assignee: C. G. Sargent's Sons Corporation, Graniteville, Mass.

[21] Appl. No.: 383,316

[22] Filed: May 28, 1982

[51] Int. Cl.³ .............................................. F26B 21/10
[52] U.S. Cl. .......................................... 34/31; 34/35; 34/48; 34/54; 34/86; 34/216
[58] Field of Search .................. 34/155, 158, 208, 152, 34/209, 162, 242, 216, 223, 212, 213, 214, 219, 86, 54, 115, 35, 48, 31; 432/4, 14, 26, 64, 8, 59

[56] References Cited

U.S. PATENT DOCUMENTS

| | | | |
|---|---|---|---|
| 1,572,326 | 2/1926 | Straight | 34/228 |
| 2,040,884 | 5/1936 | Somes | 34/228 |
| 2,326,115 | 8/1943 | Arthur | 34/228 |
| 2,763,069 | 9/1956 | Vaughn | 34/228 |
| 3,849,904 | 11/1974 | Villalobos | 34/216 |

Primary Examiner—Larry I. Schwartz

[57] ABSTRACT

Method of and apparatus for use in drying materials in a dryer through which the material is conveyed and there subjected to heat which decreases from a maximum adjacent the infeed end of the dryer to a minimum adjacent the outfeed end thereof. A controlled small volume of air is forced towards the infeed end of the dryer from the outfeed end thereof and is repeatedly brought in contact with the conveyed material substantially without added air and with the percentage of moisture carried thereby increasing until, adjacent the infeed end, a high level of sensible heat is available to effect the heating of the material and the removal of its moisture which is carried through a heat exchanger in the exhaust. The heat is recovered from the moisture laden exhaust by the heat exchanger in a manner enabling the temperature of the air when exhausted, to be at a wanted level and the recovered heat used to increase drying efficiency.

4 Claims, 3 Drawing Figures

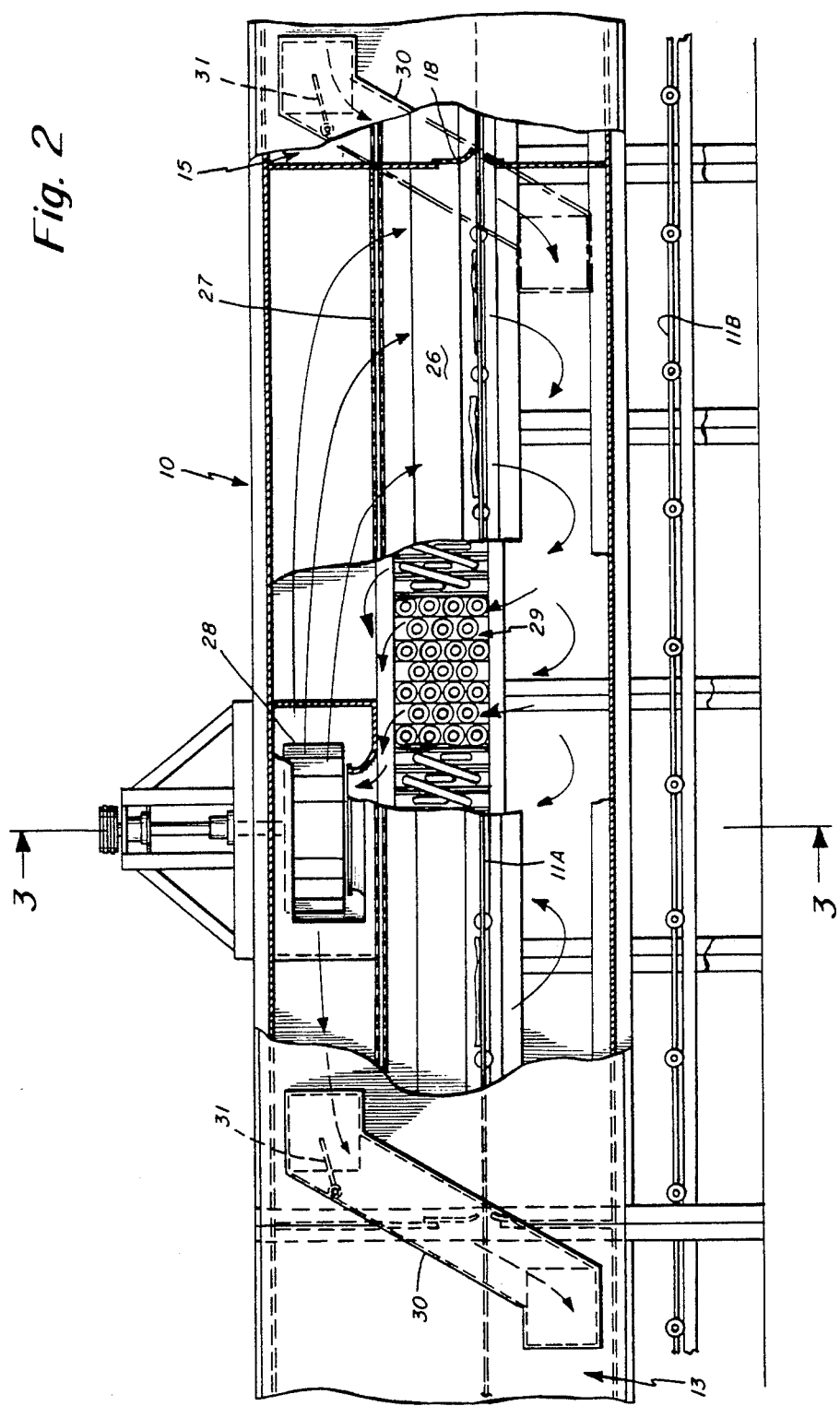

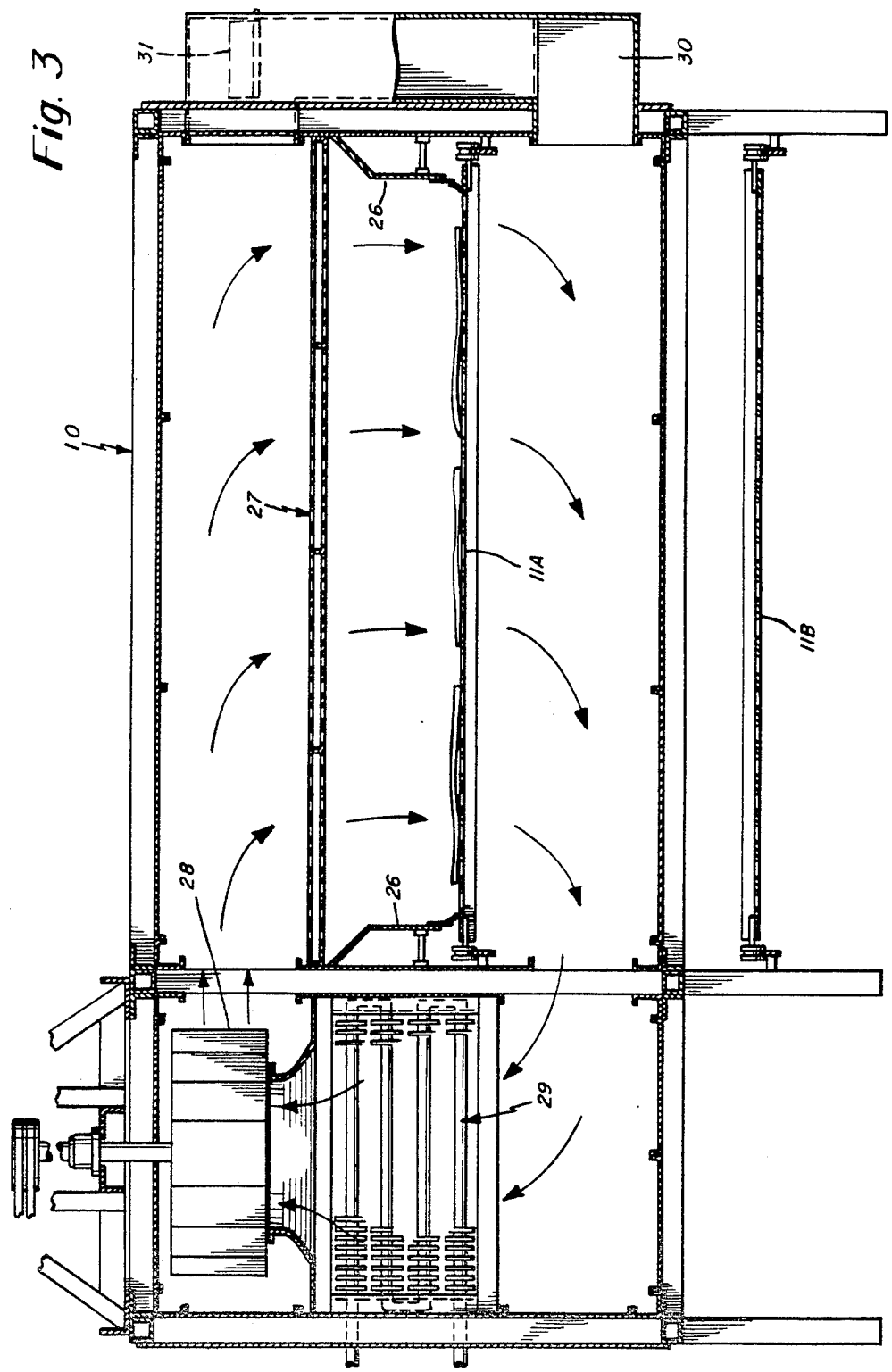

METHOD AND APPARATUS FOR DRYING MATERIALS WHILE BEING CONVEYED

BACKGROUND REFERENCES

U.S. Pat. No. 1,572,326.
U.S. Pat. No. 2,040,884.
U.S. Pat. No. 2,326,115.
U.S. Pat. No. 2,763,069.

BACKGROUND OF THE INVENTION

Materials, of which tobacco and textiles are but two examples, have long been dried in dryers through which they were conveyed and dried by subjecting them to a drying medium, usually air, heated by steam coils or other means, at a temperature often decreasing from a maximum toward the infeed end of the dryer to a minimum toward the outfeed end thereof, with the drying medium usually brought repeatedly into drying contact with the material and carrying the evaporated moisture into the exhaust system. Commonly, it is the practice, in a sizeable production dryer, to exhaust air at intervals along such a dryer and to admit fresh air at such intervals to maintain a lowered humidity.

Because fuel costs have increased so substantially, efforts have been made to effect economies in drying materials without affecting production. Among such efforts may be noted the concept of passing all the air used in drying from the outfeed end to the infeed end, of employing means to recover heat from exhausts, and, in some cases, preheating incoming air with recovered heat and also restricting the volume of the air introduced into the dryer. As far as I am aware, however, all dryers using heated air have effected drying principally by evaporation and absorption in the drying air.

THE PRESENT INVENTION

The general objective of the present invention is to provide method and apparatus by which proper drying may be attained with substantially improved efficiency and economy.

In accordance with the invention, this objective, in terms of both method and apparatus, is attained with a dryer in general of the type previously briefly described, but with the volume of air introduced into the outfeed end of the dryer so limited and its circulation in contact with the material and forwardly towards and into the infeed end of the dryer so controlled that, in contrast to conventional practices where initial drying in the infeed end portion is effected with heated, low humidity fresh air, substantially all of the introduced heated air and absorbed moisture is spiralled towards the infeed end with its temperature elevated as and if necessary to at first maintain substantial moisture absorption properties of the air and finally to utilize the high sensible heat of the now moisture laden air to heat the entered material and its moisture.

The maximum temperature of the air is, of course, limited by that at which the material being dried may be subjected without being adversely affected. In some cases, the material may be safely exposed to temperatures in excess of 212° F. while in other cases, the maximum drying temperature must be below that level. In either case, the sensible heat content of the drying medium is so enhanced as to effect more efficient transfer of heat from the heating means to the material and its moisture content and the heat and preferably hot condensate to be more efficiently reclaimed on the passage of the moisture laden exhaust through a heat exchanger. It is the sensible heat in an exhaust system that is recoverable on a cost effective basis. Where drying temperatures of the materials may be above the boiling point, moisture in the air at internal ambient pressures is actually superheated steam at that pressure, resulting in the flashing off of moisture and higher exhaust temperatures.

The reclaimed hot condensate may be used, for example, by returning it for use in a prior process and the reclaimed heat is recovered in a form enabling it to heat the air being introduced into the dryer adjacent its outfeed end. It may also be used for other purposes, such, for example as the dechilling and preheating of water. In any case the recovered heat is used to ensure that the temperature of the air, when exhausted, is reduced to a wanted level.

A further objective of the invention is to enable exhaust heat recovery to be efficiently effected in a useable manner. This objective is attained by the use of a closed loop containing coil portions in the exhaust of the dryer and in the location or locations where the reclaimed heat is to be utilized with the loop containing a medium that will remain liquid at convenient temperatures and pressures when placed under a partial vacuum by a circulating means and flash to vapor through a flow control means after passing through or within the coil portion exposed in the exhaust. The other coil portion or portions so utilize the heat that the returned liquid is at a lowered temperature enabling the temperature of the exhaust to be reduced to a wanted level. In a preferred arrangement, each coil portion includes rows connected in series counter-currently for exhaust heat reclamation and in heating entrance air, water heating or for other purposes.

Other objectives of the invention and the manner and means by which they are attained will be apparent from the following description of a preferred embodiment of the invention and the appended claims.

PRIOR ART STATEMENT

Drying practices known to me have been previously summarized which and the previously cited patents are the only prior art known to me of interest in connection with the present invention, and these are of interest only as showing it to be old to pass air from one end of a drying chamber to the other.

The prior art known to me neither discloses nor suggests the essential features of the invention which, in terms of method and apparatus are the drying of conveyed material by means of a high level of sensible heat both to provide increased efficiency in transferring heat from the heating means to the material and to enable, due to the resulting high moisture content of the exhaust, heat recovery to be more efficiently achieved and utilized on a cost effective basis.

BRIEF DESCRIPTION OF THE DRAWINGS

The accompanying drawings illustrate a dryer and associated heat recovery means in accordance with the invention

FIG. 2 is a longitudinal view of a zone of a dryer and portions of adjacent zones; and FIG. 3 is a section taken approximately along the indicated line 3—3 of FIG. 2.

A PREFERRED EMBODIMENT OF THE INVENTION

Figure 1:
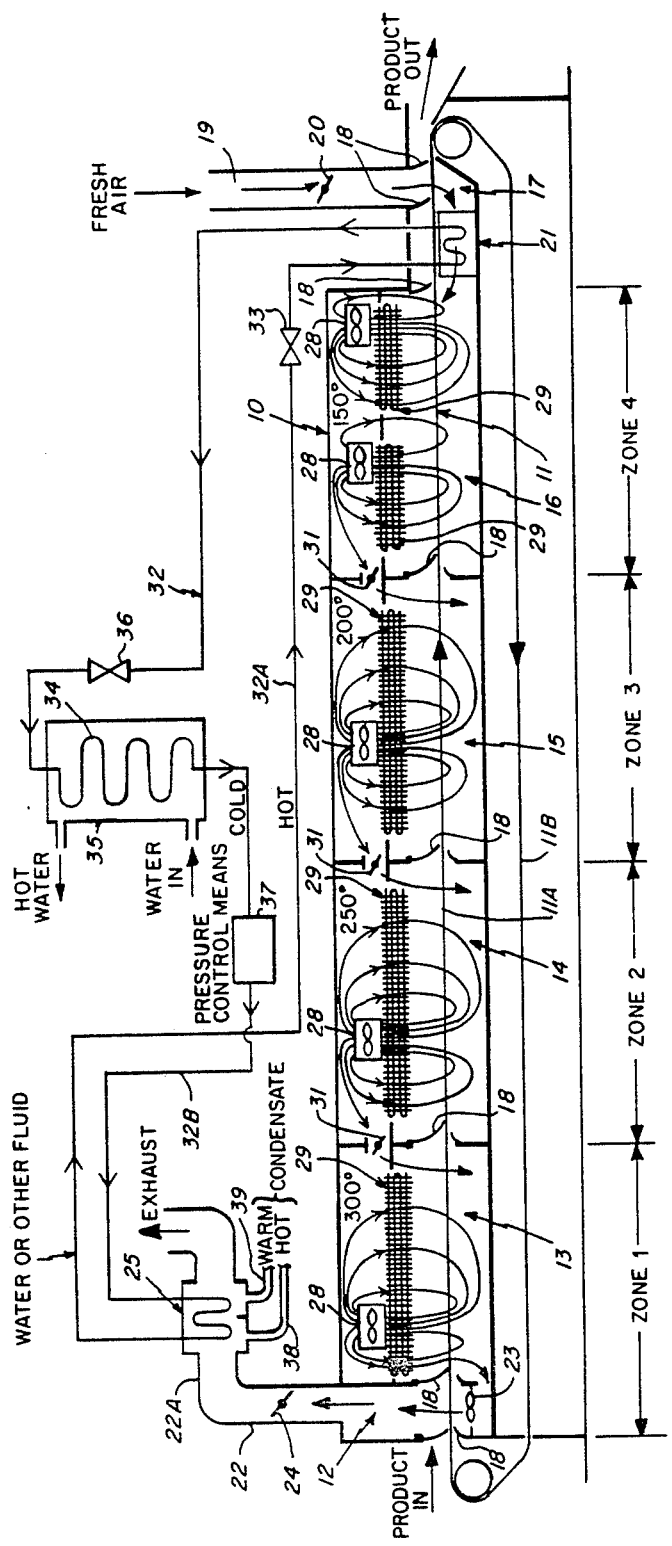
FIG. 1 is a schematic view thereof.

A dryer generally indicated at 10 is schematically illustrated by FIG. 1 and is shown as having the material conveying course 11A of a conveyor, generally indicated at 11, extending from its infeed end, where it receives material to be dried from a conventional infeed system, (not shown) through a chamber from the outfeed end of which the dried material is discharged, typically onto a take-away conveyor, not shown. The lower, return course 11B of the conveyor passes under the chamber.

The chamber is shown as having an infeed section 12, drying sections or zones 13, 14, 15, and 16 and a discharge section 17. At the infeed end of each of the sections 13–17 there is a conventional air lock 18 and the discharge section 17 has a second such air lock 18, the two air locks of that section constituting a portion of a fresh air inlet 19 having a damper 20 above the conveyor course 11A and a heat exchanger 21 below that course and from which fresh air enters the drying section 16. The air locks 18 of the infeed section and drying section 13 constitute an interior portion of the exhaust 22 which is shown as having a fan 23 below the conveyor course 11A, a damper 24 and a horizontal section 22A in which a heat exchanger 25 is located.

Each of the drying sections 13–16 has, see FIGS. 2 and 3, stock guards 26 extending along the sides of the conveyor course 11A and between that course and an overlying diffuser plate 27. In each of the drying sections, there is at least one fan 28 positioned to draw air laterally from below the conveyor course 11A upwardly through heating means generally indicated at 29 and shown as the commonly employed banks of steam coils, and then discharge the heated air into the space above the diffuser plate 27. As a consequence, the heated air is circulated downwardly through the conveyor course 11A in drying contact with the material being carried thereby with the heated air repeatedly circulated in this manner which is commonly known as "down draft" drying. In dryers where the fans are located below the heating means, the air circulation is upwardly with respect to the material being dried, a drying process commonly referred-to as "up draft" drying. In either case, the space in each zone from which air is drawn by the fan 23 of that zone is at a pressure less than that on the opposite side of the conveyor course 11A.

Air advances from one section to the next towards the infeed end of the dryer due to such a pressure differential. While this may be effected by employing a fan to discharge heated air from a section at a rate such that wanted recirculation occurs therein with a wanted limited volume being advanced towards the infeed end of the dryer, the expense of such fans may be and is preferably avoided by each drying section 14, 15, and 16 provided with an air transfer conduit 30 effecting communication between the high pressure area existing above the conveyor course 11A and the low pressure area existing below the conveyor course 11A in the next drying section towards the infeed end of a dryer. Instead of the downwardly and forwardly inclined position of the conduit 30 in the case of down draft drying, the conduits are oppositely inclined when up draft drying is practiced. Each conduit 30, in either case, is provided with a damper 31.

The number of times the air in any section is circulated through the conveyor course 11A in contact with the conveyed material and through the heating means 29 is determined in part by the volumetric capacity of the fan or fans employed and in part by the settings of the damper 31 and the pressure differential, in any case, the circulating air advances in a generally spiral fashion at least with respect to the overall travel of the air with the air circulation in each drying section indicated in FIG. 1.

Before detailing the disclosed heat recovery means, it will be noted that in FIG. 1, the heating means 29 of each section have been given an assumed temperature with the temperature increasing to a maximum in the first or wet end drying section 13. It is assumed that the material being dried is capable of withstanding a temperature of 300° F. established by the heating means 29 in the section 13, at least while the material is passing therethrough.

It may be here noted that one primary objective and function of the invention is to provide an exhaust stream from the dryer adjacent its infeed end that is so moisture laden that heat may be efficiently recovered therefrom and so utilized as to maintain an appropriate temperature drop across the heat exchanger 25, typically so that the temperature of the exhausted air will be at a temperature suitable for space heating, when, say a 70° F. temperature is to be maintained and with the recovered energy utilized for one or more of the following: increased drying efficiency as by supplying heat to the heat exchanger 21 and using the recovered heat in associated processes, equipment or both.

It is of course a primary objective and function of the invention to enable material drying to be effected with increased economy and efficiency and the manner in which this result is attained will be apparent from the following description of an assumed drying operation in which the ambient air temperature is assumed to be at 70° F. and the assumed temperature of the material approximately 140° F. as it leaves the drying section 16 with close to the wanted dryness.

The 70° F. incoming air is drawn through the material in the discharge section 17 and further dries the material to the desired moisture content and cools the material to, say, 75°–80° F. and enters the heat exchanger 21 at about 90° F. and its temperature is raised by the heat exchanger 21 to about 150° F. The circulating volume of air in section 16 is heated to about 150° F. but loses 10° F. to drying. The controlled volume of air from section 17, with the heat and moisture absorbed in section 17, flows into the lower pressure space in section 16, there mixing with the spent air at 140° F. which mixture is then reheated to 150° F.

The circulating volume of air in section 15 is heated to 200° F. but loses about 20° F. to drying. The controlled volume of air from the fan of section 16 at 150° F. and containing moisture picked up from sections 17 and 16 flows into the lower pressure 180° F., spent air space of section 15, mixing therewith and being reheated to 200° F.

The circulating volume of air in section 14 is heated to 250° F. but loses about 25° F. to drying. The controlled volume of air from the fan of section 15 at 200° F. and containing moisture picked up in sections 17, 16, and 15 flows into the lower pressure 225° F. spent air space of section 14, mixing therewith and being reheated to 250° F.

The circulating volume of air in section 13 is heated to 300° F. but loses about 50° F. to heating and drying.

Occurring in section 14, but not previously mentioned, but occurring to a greater extent in section 13, is the maintenance of a highly moist, air-water vapor mixture well above the boiling point at approximately atmospheric pressure with about 38° F. of superheat and hence an extremely high degree of sensible heat.

The increased level of sensible heat therefore increases the efficiency of transfer of energy from the heating means 29 to moisture in the material, causing rapid heating and flashing of moisture into steam.

With an assumed spent air temperature of 250° F. and with a high level of sensible heat in the section 13, it is advantageous to pass the controlled exhaust volume through the infeed material, as by means of the fan 23, disposed over such an area in the exhaust 12 that the velocity allows a portion of that energy to preheat incoming material leaving only such energy as is necessary to prevent objectionable condensation in the exhaust 12 and to cause the fluid exiting from the heat exchanger 25 to be at the desired temperature for the inlet heat exchanger 21.

At this point, it will be apparent that two important objectives have been attained. Not only has the volume of air that has had to be heated been held to a minimum but also its humidity is so increased that large amounts of sensible heat are available and used for the quick heating and flashing off of moisture from the material at or near the wet end of the dryer, enabling overall operating temperatures to be lower than normal. In addition, the moisture laden exhaust passing into and through the heat exchanger 25 contains a relatively small volume of air and with steam having enough superheat to avoid condensation problems.

The heat exchanger 25 is of a type having at least two rows of coils included in a loop generally indicated at 32. The heat exchanger 21 is also of a type having at least two rows of coils. The loop portion 32A includes the first row of coils, the first and then the second row of coils of the heat exchanger 21 and an intermediate temperature regulating valve 33. The loop 32 contains a liquid which, at a convenient pressure, will expand and flash to 220° F. vapor when released through the valve 33.

In the disclosed embodiment of the invention, it is assumed that the temperature of the vapor does not drop below 200° F. in passing through the heat exchanger 21 but is returned at 60° F. to the second row of coils of the heat exchanger 25 via the loop portion 32B where the second row of coils of the heat exchanger 25 is heated by the exhaust stream to 140° F. and its temperature further raised to 225° F. by the first row of coils with the temperature of the exhaust fluid reduced from 250° F. to 70° F. or 80° F.

An important advantage of the invention is that a large percentage of the heat used in drying can be recovered and if in excess of that required for preheating incoming air, such excess can be used for various purposes of which one is to dechill boiler water and at the same time ensure the return of the liquid in the loop portion 32B at its wanted reduced temperature.

For that purpose, the loop course 32B includes a coil 34 in a tank 35 in the boiler water supply line. Desirably the loop portion 32B has a prior regulating valve 36 and a pressure control means 37, which may be a pump, between the tank 35 and the second row of coils of the heat exchanger 25.

The various temperature levels above referred to were selected to make the method readily apparent and are not actual performance data but are considered to reasonably approximate attainable figures.

It is also an objective of the invention to utilize the condensate from the heat exchanger in prior operations such as in slurry vats to which the heated condensate is returned. As illustrated in FIG. 1, the condensate may be collected from the hot end of the heat exchanger 25 and delivered via a conduit 38 for one purpose while condensate collected from the warm end of the heat exchanger 25 may be delivered via a conduit 29 for use for another purpose.

I claim:

1. The method of drying material that consists in conveying the material through a drying chamber from end-to-end thereof, introducing air into the chamber adjacent the outfeed end thereof, heating the air and circulating the heated air repeatedly in contact with the material and forwardly towards the infeed end of the chamber, controlling the intake to exhaust air volume and the heating of the circulated air in a manner such that the air temperature is increased as necessary to at least prevent condensation in the material from a desired minimum adjacent said outfeed end to a desired maximum adjacent said infeed end, limiting the intake to exhaust air volume to that necessary to carry forward the moisture removed from the outfeed end material and to provide a relatively high humidity as the air temperature approached the maximum temperature necessary to provide a high level of sensible heat, heating and drying the material therewith, exhausting a regulated volume of the moisture laden air from said chamber adjacent said infeed end, and recovering heat therefrom, introducing air into the outfeed end of the dryer by preheating such air by drawing air into the chamber in heat exchanging relation to the material passing through said outfeed end and then employing recovered heat to increase the heat of the introduced air.

2. The method of claim 1 in which the step of exhausting regulated volume of moisture laden heated air from the dryer includes the forcing of moisture laden air upwardly through the conveyed material adjacent the infeed end of the conveyor while blocking the flow of moisture laden air above the material from entering said zone.

3. A dryer, said dryer including a chamber, means operable to convey material through said chamber, said chamber having an air intake adjacent its outfeed end and an exhaust adjacent its infeed end, means within said chamber operable to heat air from a desired minimum adjacent said outfeed end at least to a necessary maximum adjacent said infeed end, means to circulate the heated air to effect its repeated contact with the material and its travel towards said infeed end, means operable to limit the volume of intake to exhaust air to that necessary to carry towards the exhaust the moisture removed from the material and to provide a humidity therefor such that as the air temperature approaches said maximum, a high level of sensible heat is provided for drying the material adjacent said infeed end, and means operable to recover heat from the exhaust as a contained fluid, said means including a sealed loop including a first coil portion arranged in the exhaust to function as a heat exchanger, a second coil portion arranged in the air intake in a position in which the entering air comes immediately in contact therewith after coming in contact with the material and intermediate expansion orifice and a circulating pump, a heat exchanger in the exhaust and means to ulilize said fluid in a manner such that a temperature drop is maintained across the heat exchanger such that the temperature of the air, when exhausted, is reduced to a wanted level.

4. The dryer of claim 3 in which the exhaust includes a section within the dryer adjacent the infeed end thereof, the material conveying means passed horizontally through said section, and a fan in said section is positioned below said conveying means and is operable to force air that is to be exhausted upwardly through the conveying means.

* * * * *